(12) United States Patent
Chen (10) Patent No.: US 9,167,256 B2
(45) Date of Patent: *Oct. 20, 2015

(54) METHOD AND APPARATUS FOR ENCODING (75) Inventor: Jing Yang Chen, San Diego, CA (US)

(73) Assignee: ARRIS Technology, Inc., Suwanee, GA (US)

(*) Notice: Subject to any disclaimer, the term of this patent is extended or adjusted under 35 U.S.C. 154(b) by 340 days.

This patent is subject to a terminal disclaimer.

(21) Appl. No.: 12/872,909

(22) Filed: Aug. 31, 2010

(65) Prior Publication Data

US 2012/0051420 A1 Mar. 1, 2012

(51) Int. Cl.
| H04N 19/14 | (2014.01) |
| H04N 19/11 | (2014.01) |
| H04N 19/154 | (2014.01) |
| H04N 19/172 | (2014.01) |
| H04N 19/115 | (2014.01) |
| H04N 19/137 | (2014.01) |

(52) U.S. Cl.
CPC ........... H04N 19/154 (2014.11); H04N 19/115 (2014.11); H04N 19/137 (2014.11); H04N 19/14 (2014.11); H04N 19/172 (2014.11)

(58) Field of Classification Search
USPC .................. 375/240.01, 240.02, 240.05, 242, 375/E7.126; 370/282, 465, 468, 477, 537; 348/385, 385.1
See application file for complete search history.

(56) References Cited

U.S. PATENT DOCUMENTS

| 5,159,447 A * | 10/1992 | Haskell et al. ........... 375/240.05 |
| 5,861,919 A * | 1/1999 | Perkins et al. ............. 348/385.1 |
| 6,038,256 A * | 3/2000 | Linzer et al. ............. 375/240.12 |
| 6,167,084 A * | 12/2000 | Wang et al. ............. 375/240.02 |
| 6,243,417 B1 * | 6/2001 | Obikane et al. .......... 375/240.03 |
| 6,493,388 B1 * | 12/2002 | Wang ........................ 375/240.12 |
| 6,594,271 B1 * | 7/2003 | Wu et al. ........................ 370/412 |
| 6,731,685 B1 * | 5/2004 | Liu et al. .................. 375/240.14 |
| 7,418,007 B1 * | 8/2008 | Liu et al. ....................... 370/468 |
| 7,843,824 B2 * | 11/2010 | Wu ............................. 370/230.1 |
| 2005/0002453 A1 * | 1/2005 | Chang et al. ............. 375/240.03 |
| 2006/0104346 A1 * | 5/2006 | Li et al. .................... 375/240.01 |
| 2008/0260278 A1 * | 10/2008 | Zuo et al. ...................... 382/251 |
| 2009/0003446 A1 * | 1/2009 | Wu et al. .................. 375/240.16 |
| 2009/0003447 A1 * | 1/2009 | Christoffersen et al. 375/240.16 |
| 2009/0074075 A1 * | 3/2009 | Au et al. ................... 375/240.22 |
| 2009/0207910 A1 * | 8/2009 | Knee ........................ 375/240.02 |

OTHER PUBLICATIONS

Teixeira et al, Statistical Multiplexing of H.264 Video STreams Using Structural Similarity Information, Journal of Information Science and Engineering, vol. 25, 2009, pp. 703-715.*

Boroczky et al, Statistical Multiplexing Using MPEG-2 Video Encoders, IBM Journal of Research and Development, vol. 43, No. 4, Jul. 1999, pp. 511-520.*

(Continued)

*Primary Examiner* — Jay Patel
*Assistant Examiner* — Reza Aghevli
(74) *Attorney, Agent, or Firm* — Thomas A. Ward (57) ABSTRACT

A system for encoding video data calculates a need parameter for an encoder and then adds a predetermined need bias value to the need parameter. The bias value is added without first determining video source complexity. The system then determines whether the input video comprises static video. Thereafter, the need parameter bias value is scaled in response to a determination that the input video includes the static video.

17 Claims, 5 Drawing Sheets

(56) References Cited

OTHER PUBLICATIONS

Boroczky et al, Joint Rate Contro; with Look-Ahead for Multi-Program Video Coding, IEEE Transactions on Circuits and Systems for Video Technology, vol. 10, No. 7, Oct. 2000, pp. 1159-1163.*

Boroczky et al., "Joint Rate Control with Look-Ahead for Multi-Program Video Coding", IEEE Trans. Cir. and Sys. for Video Technology, vol. 10, No. 7, Oct. 2000, pp. 1159-1163 disclose an algorithm for rate control of multiple compressed video bit streams.*

Boroczky et al., "Statistical Multiplexing Using MPEG-2 Video Encoders", IBM J. Res. Develop., vol. 43, No. 4, Jul. 1999, pp. 511-520 disclose a system for statistical multiplexing of several compressed video streams.*

Teixeira et al, "Statistical Multiplexing of H.264 Video Stream Using Structural Similarity Information", J. of Inf. Sc. and Eng., vol. 25, 2009, pp. 703-715 disclose a method for broadcast of video programs.*

* cited by examiner

METHOD AND APPARATUS FOR ENCODING

BACKGROUND

Multiple programs are known to be encoded and sent over a common channel having a fixed limited bandwidth using a technique known as statistical multiplexing. Statistical multiplexing is a type of communication link sharing in which a communication channel is typically divided into an arbitrary number of digital channels or data streams. The multiple programs may be statistically multiplexed using a multiplexer (often referred to as a STAT MUX), a rate controller and a plurality of encoders. The communication channel is known to have a bandwidth limitation. Because the multiple programs often have a variable bit rate (VBR) and the communication channel has a bandwidth limitation, bit distribution over the multiple programs is known to be problematic.

In typical operation, the transmission bit rates for each of the encoders is a delayed version of the encoding bit rates for the same encoder by a predetermined delay. The predetermined delay may be, for instance, 1.5 seconds and is an initial delay from an encoding time (a current program clock reference (PCR)) to a decoding time (the decode time stamp (DTS) of the first encoding frame). This predetermined delay is known as a system delay.

The multiplexer may change transmission bit rates upon requests from the encoders through a minimum bit rate request and a maximum bit rate request. The minimum bit rate request informs a rate controller of a lowest rate at which video may be sent that allows receipt of complete frames at a decoder prior to decoding. The maximum bit rate informs the rate controller of a highest rate at which video may be sent to the decoder. The encoders retain all encoding bit rates received in the past predetermined delay and uses this information to calculate a target frame size and an initial quantization parameter (QP) level for each frame to be encoded. As soon as an encoder finishes encoding a frame, the encoder updates a current need parameter. The encoders also use a current transmission bit rate to regulate the amount of bits transferred to the multiplexer and update the minimum bit rate request and the maximum bit rate request at each interrupt. An interrupt is triggered as soon as a bit rate information message arrives at the encoder.

Each encoder calculates the need parameter based on the complexities of past encoded frames and look-ahead activities of the incoming frames. The complexity of a past encoded frame is defined by the product of the bits used for this frame and the average quantizer for this frame. The multiplexer allocates more bits (bandwidth) for the encoders having video input of higher complexity while maintaining the constant group bandwidth in an effort to keep all the encoders running at the same QP level.

In order to keep all encoders running at the same perceptible quality levels (not necessary the same QP levels), the encoders are known to add a need parameter bias to the need parameter. The need parameter bias is a perceptibly determined constant across all encoders with video input of motion pictures. With the constant need parameter bias, the encoders having video input of lower complexity run at lower QP levels that mitigate the compression artifacts. Although the encoders having video input of higher complexity may run at higher QP levels, the compression artifacts are obscured somewhat by the high video complexity.

Although the constant need parameter bias scheme works as expected when all the encoders have dynamic video input, whenever any of the encoders has static video input (video that is stable and has low complexity), such as a slate, the encoder cannot produce enough bits to fill the allocated bit rate. The unused bandwidth is thus wasted.

SUMMARY

Disclosed herein is a method for encoding data, according to an embodiment. In the method, a current need parameter is calculated for the encoder based on a complexity of video being input to the encoder. A need parameter bias value having a predetermined value is added to the current need parameter. A determination whether the input video comprises static video is made. Thereafter, the need parameter bias value is scaled in response to a determination that the input video comprises static video.

Also disclosed herein is an encoder, according to an embodiment. The encoder includes one or more modules configured to calculate a current need parameter for the encoder. The current need parameter is based on a complexity of input video to the encoder. The one or more modules are also configured to add a need parameter bias value having a predetermined value to the current need parameter, determine whether the input video comprises static video, and scale the need parameter bias value in response to a determination that the input video comprises static video. The encoder also includes a processor configured to implement the one or more modules.

Further disclosed is a computer readable storage medium on which is embedded one or more computer programs implementing the above-disclosed method for encoding data, according to an embodiment.

Through implementation of the method and apparatus disclosed herein, the need parameter bias value may be scaled, for instance, reduced, to accommodate for the reduced bandwidth required to encode static video, which has relatively low complexity. In one regard, by reducing the need parameter bias value for an encoder, the amount of bandwidth allocated to the encoder when the encoder is encoding static video is substantially minimized, thereby reducing or minimizing wasted bandwidth allocation to the encoder.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

1. Statistical Multiplexing System

Figure 1:
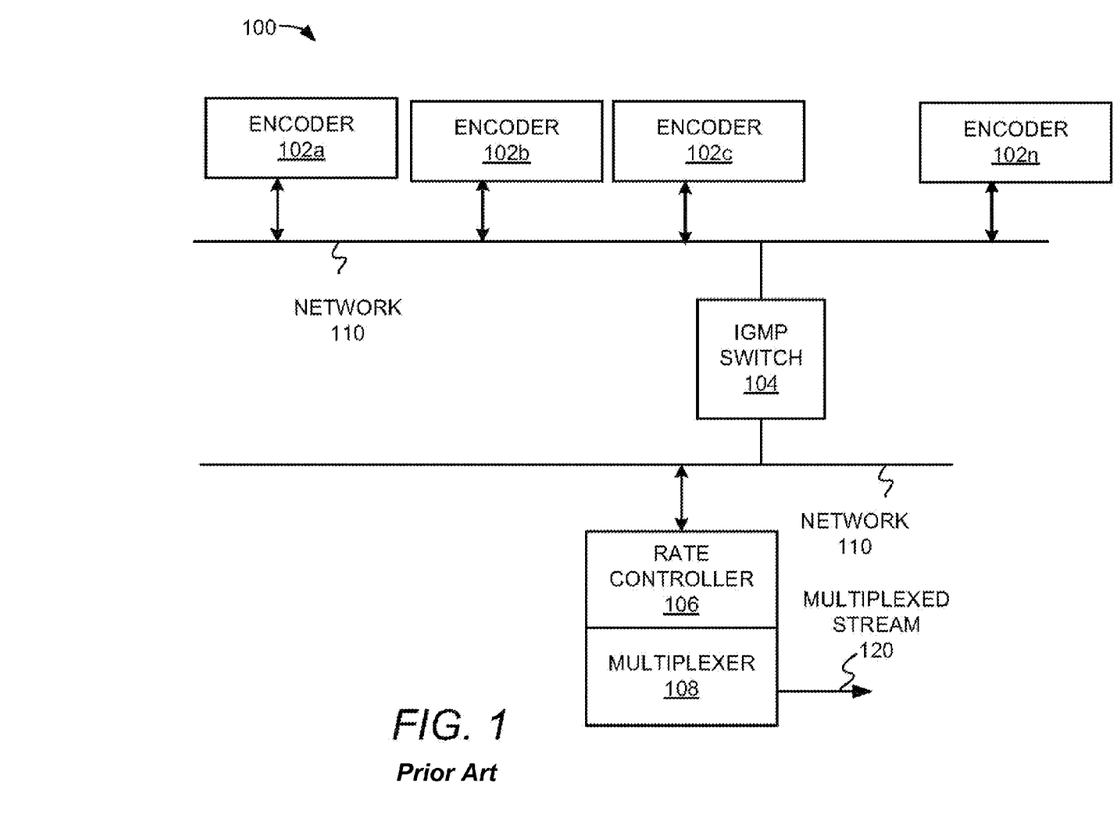
FIG. 1 illustrates a simplified block diagram of a statistical multiplexing system, according to an embodiment.

FIG. 1 illustrates a simplified block diagram of a statistical multiplexing (stat mux) system 100 configured to statistically multiplex a plurality of encoders 102a-102n, according to an embodiment. As shown in FIG. 1, the stat mux system 100 includes the plurality of encoders 102a-102n, a rate controller 106, a multiplexer 108, and an Internet group management protocol (IGMP) switch 104. The rate controller 106 is configured to, for instance, communicate with the encoders 102a-102n using Internet protocol (IP) multicast. It should be understood that the stat mux system 100 depicted in FIG. 1 may include additional components and that some of the components described herein may be removed and/or modified without departing from a scope of the stat mux system 100.

Each of the plurality of encoders 102a-102n is configured to receive source data (not shown) having varying levels of complexity. The encoders 102a-102n encode the bits contained in the source data to form a plurality of corresponding variable bit rate (VBR) streams using bandwidth allocated by the rate controller 106. The encoders 102a-102n may encode the source data using any suitable encoding technique, such as, Moving Picture Experts Group (MPEG) encoding standards including MPEG-4 part 10, which is also referred to as MPEG-4 AVC (Advanced Video Coding), and MPEG-2. The multiplexer 108 thereafter multiplexes the plurality of VBR streams received from the encoders 102a-102n to form a single bit stream 120, for instance, a constant bit rate (CBR) stream. The bit rate of the single bit stream 120 may be determined by, for instance, a channel rate.

The rate controller 106 is configured to generate a periodic interrupt during which an interrupt service routine is performed, at a predetermined time interval, such as, for instance, approximately 848 microseconds. During the interrupt service routine, the rate controller 106 receives a need parameter message from each of the encoders 102a-102n. The need parameter message includes a current need parameter, a minimum bit rate request, and a maximum bit rate request for each of the encoders 102a-102n. The current need parameter for an encoder 102a is based upon a complexity level of the source data to be encoded by that encoder 102a. The rate controller 106 uses the information contained in the need parameter message to allocate encoding bit rates and the transmission bit rates for each of the encoders 102a-102n.

In this regard, the rate controller 106 may send a multicast user datagram protocol/Internet protocol (UDP/IP) bit rate information message at each instance of the predetermined time interval. In this example, the bit rate information message contains the allocated encoding bit rates and the transmission bit rates for each of the encoders 102a-102n. The bit rate information message is determined based upon the need parameter for each of the encoders 102a-102n and a need parameter bias, which is a predetermined value used to reduce end user perception of compression artifacts in the video. Each of the encoders 102a-102n is configured to receive the bit rate information message from the rate controller 106 and to consequently return the need parameter message to the rate controller 106 in a multicast UDP/IP datagram.

When the source data being inputted into an encoder 102a is of a sufficiently low level of complexity to be construed as static video input, that encoder 102a is unable to produce a sufficient number of bits to fill the bit rate allocated to that encoder 102a at that time. According to an embodiment, the rate controller 106 is configured to determine the unused bandwidth from encoders in the plurality of encoders 102a-102n and to re-allocate the unused bandwidth to one or more of the other encoders 102a-102n. As discussed in greater detail here and below, the reallocation of unused bandwidth is achieved by adjusting the need parameter bias for those of the encoders 102a-102n having unused bandwidth.

2. Adjusting Need Parameter Bias Value

The encoders 102a-102n are configured to adjust respective need parameter bias values based upon a determination as to whether the source data that the encoders 102a-102n are currently receiving or about to receive comprises static video. Static video may be defined as video of stable and relatively low complexity, such as, video in which a plurality of consecutive frames have relatively small changes with respect to each other for at least a predetermined interval of time.

The encoders 102a-102n may use any reasonably suitable manner of determining when the source data comprises static video. According to an embodiment, each of the encoders 102a-102n is configured to use a decoder buffer model in making this determination. The decoder buffer model generally comprises a model configured to predict a capacity utilization of a decoder buffer (not shown) to which an encoder 102a is configured to communicate encoded bits. The decoder buffer model may identify the rate at which the decoder is configured to decode the encoded bits received from the encoder 102a and may therefore predict the capacity utilization of the decoder buffer at any given time.

In this embodiment, each of the encoders 102a-102n is configured to store data pertaining to the number of bits generated during a preceding time interval and predict the capacity utilization and/or remaining capacity of the decoder buffer using the decoder buffer model. For example, each of the encoders 102a-102n may store the amount of encoded bits generated during the past 1.5 seconds. Using the encoded bits generated during the past 1.5 seconds and the current capacity utilization of the encoder buffer, the encoders 102a-102n may each determine the current capacity utilization and/or remaining capacity of the decoder buffer. Each of the encoders 102a-102n is also configured to store the encoding bit rates received during a preceding time interval and predict the bits to be transferred in the next time interval. For example, each of the encoder 102a-102n may store the encoding bit rates received during the past 1.5 seconds. Using the encoding bit rates received during the past 1.5 seconds and the current capacity utilization of the decoder buffer predicted above, the encoders 102a-102n may each determine bits to be transferred in a next time interval, for instance the next 1.5 seconds, at each frame's encoding time. In addition, the preceding time interval and the next time interval may be of equal duration.

The bits to be transferred in the next time interval may be referred to as "system bits", and are transferred in the next system delay to fulfill the allocated bandwidth. The encoders 102a-102n are also configured to sum the bits generated in the preceding time interval at each frame's encoding time, which are referred herein as "bits used". In order to maintain the decoder buffer capacity utilization at a safe range centered approximately at a predetermined target level, the rate controller 106 manages rate control procedures for the encoders 102a-102n to keep the bits used in a past system delay approximately equal to the system bits to be transferred in a next system delay. The rate control procedures are performed while substantially maintaining quantization parameters (QPs) of I, P, and B frames at an appropriate ratio. In addition, the predetermined target level may comprise a level in which the decoder buffer contains a sufficient amount of data for uninterrupted display of video, while remaining within a safe operating range of the decoder buffer capacity limit.

Each of the encoders 102a-102n is configured to set aside a guard band that is equal to a predetermined portion of the bits used. The guard band may comprise, for instance, half of the value of the bits used, or another set or variable value. If the bits used plus the guard band for a particular encoder 102a is fewer than the system bits at a frame's encoding time, this frame is classified as under-utilized and it may be inferred that the bits produced in the past 1.5 second up to this frame are insufficient to fill the allocated bandwidth for the particular encoder 102a. If, for instance, the bits used plus about half of the guard band is more than the system bits at a frame's encoding time, this frame is classified as fully-utilized. The encoders 102a-102n initially operate with the need parameter bias value equal to the predetermined value. For those of the encoders 102a-102n receiving dynamic video input, the bits used are approximately equal to the system bits so that all the video frames are fully-utilized and the need parameter bias value stays at the predetermined value.

Upon first detection of an under-utilized frame, the encoder that receives the under-utilized frame, for example encoder 102a, starts a detection procedure for the static video. After starting the detection procedure, the encoder 102a begins to count the number of the under-utilized frames. If the encoder 102a receives a predetermined number of consecutive frames, for instance a number of the under-utilized frames reaches a predetermined value before a fully-utilized frame is detected, the encoder 102a determines that the video input is static and enters a state in which the need parameter bias value is scaled down. This state may be referred to as a static video mode of the encoders 102a-102n. Under the static video mode, the encoder 102a may scale down the need parameter bias value by a ratio depending on the bits used and the system bits until the need parameter bias values reaches a predetermined minimum value or the encoder 102a reaches an equilibrium state. At the equilibrium state, the encoder 102a operates with a small unused bandwidth approximately equal to the guard band. By scaling the need parameter bias value down when the encoder 102a is in the static video mode, the amount of wasted or unused bandwidth is substantially reduced for the encoder 102a as compared to the bandwidth that is normally wasted under conventional bandwidth allocation techniques. If, at any time, the encoder 102a detects the bits used plus half of the guard band is more than the system bits, the encoder 102a immediately resets the need parameter bias value to the predetermined constant value.

When the encoder 102a enters the static video mode, the encoder 102a is in an equilibrium state with a small unused bandwidth. When the static video mode is initiated, the bits used plus the projected unused bandwidth, or the guard band, is less than the allocated bandwidth for the encoder 102a. In response to this condition, the encoder 102a scales down the need parameter bias value. In response to the reduction in the need parameter bias value, the rate controller 106 reduces the bandwidth allocated to the encoder 102a. According to an embodiment, the scaling process is continuous until the used bandwidth plus the guard band is equal to the allocated bandwidth. At this point, the encoder 102a stops scaling the need parameter bias value and operates at the so called equilibrium state. At the equilibrium state, the bits used plus the unused bandwidth is equal to the allocated bandwidth. The unused bandwidth is approximately equal to the guard band. Because the guard band is relatively small when the encoder 102a is in static video mode, the unused bandwidth is also relatively small. In the static video mode, if the input video becomes complex or dynamic, the bits used will increase and the used bandwidth plus half of the guard band will likely exceed the allocated bandwidth. When this occurs, the encoder 102a immediately resets the need parameter bias value to the predetermined constant value. In addition, the rate controller 106 increases the bandwidth allocated to the encoder 102a. The encoder 102a consequently returns operation to the dynamic video mode, at which, the bits used is equal to the allocated bandwidth. As such, there is little to no unused bandwidth.

In one regard, therefore, the guard band disclosed herein prevents an encoder that is receiving static video input from oscillating between the static video mode and the dynamic video mode at a relatively pace. The guard band is self regulating, in that, input is not required from other sources to prevent false detection of under-utilized frames. According to an embodiment, the guard band is selected to be about 50% of the bits used to provide a sufficient margin to substantially prevent false detection of the under-utilized frames. With dynamic video input, the guard band is sufficiently large to prevent any false detection of the under-utilized frames. With static video input, the guard band is relatively small so that the wasted unused bandwidth is also small. Because the methods disclosed herein are designed to detect the under utilization of the allocated bandwidth, the methods disclosed herein provide a definite quantity to scale the need parameter bias value.

According to an embodiment, the encoder 102a may be substantially prevented from determining that relatively short periods of input video having relatively low complexity from being determined to be static. This embodiment may be referred to as long term bit detection. In this embodiment, a relatively long duration of time, such as, around 1.5 seconds, is selected as a time range that is required to be exceeded prior to the encoder 102a determining that the input video is static. More particularly, for instance, by requiring that the video input be determined as being static for the selected time duration prior to the encoder 102a entering into the static video mode, a quick fade in the video, for instance, will not automatically cause the encoder 102a to determine that the input video is static. In addition, the long term bit detection will not cause the bits used to dip below the system bits thereby causing detection of static video for relatively short periods of time. With the use of one or more of the self regulating guard band, the long term bit detection, and requirement for the predetermined number of consecutive frames to start the adjustment of the need parameter bias value, the embodiments disclosed herein are relatively stable and thus substantially avoid unnecessary detection and adjustment for static video input that fails to last for at least a predetermined length of time.

Figure 2:
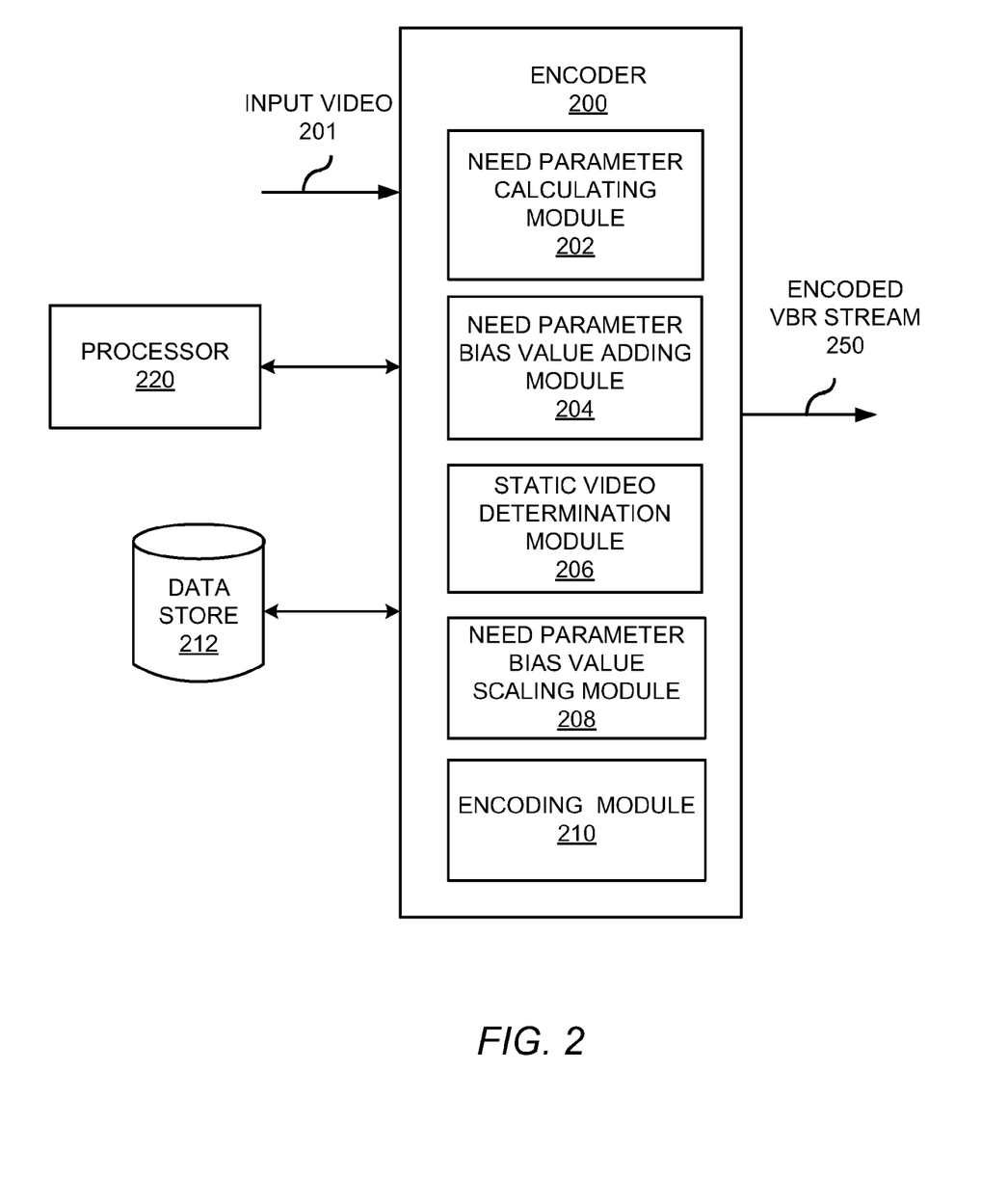
FIG. 2 illustrates a simplified block diagram of an encoder, according to an embodiment.

FIG. 2 illustrates a simplified block diagram of a encoder 200 configured to encode input video, for instance, the encoder 102a described with respect to FIG. 1 hereinabove, according to an embodiment. It should be understood that the encoder 200 depicted in FIG. 2 may include additional components and that some of the components described herein may be removed and/or modified without departing from a scope of the encoder 200.

The encoder 200 is depicted as including a need parameter calculating module 202, a need parameter bias value adding module 204, a static video determination module 206, a need parameter bias value scaling module 208, and an encoding module 210. The modules 202-210 may comprise software modules, hardware modules, or a combination of software and hardware modules. Thus, in one embodiment, one or more of the modules 202-210 comprise circuit components. In another embodiment, one or more of the modules 202-210 comprise software code stored on a computer readable storage medium, which is executable by a processor. As such, in one embodiment, the encoder 200 comprises a hardware device. In another embodiment, the encoder 200 comprises software stored on a computer readable medium.

The need parameter calculating module 202 is configured to calculate a current need parameter for the encoder 200 in encoding bits of data contained in the input video 201. The current need parameter is based on a complexity of the input video 201. The need parameter bias value adding module 204 is configured to add a need parameter bias value having a predetermined value to the current need parameter. The need parameter bias value generally comprises a perceptibly determined constant value across all of the encoders 102a-102n in the stat mux system 100 to substantially cause all of the encoders 102a-102n to run at substantially the same perceptible quality levels. The static video determination module 206 is configured to determine whether the input video 201 comprises static video and the need parameter bias value scaling module 208 is configured to scale the need parameter bias value in response to a determination that the input video 201 comprises static video. The encoder 200 also includes a processor 220 configured to implement the one or more modules 202-210. The encoder 200 may output an encoded VBR stream 250 to a multiplexer (not shown).

The processor 220 may comprise a microprocessor, a micro-controller, an application specific integrated circuit (ASIC), and the like. In addition, the modules 202-210 may be configured to access a data store 212 that stores various information that the modules 202-210 may access. The data store 212 may comprise volatile and/or non-volatile memory, such as DRAM, EEPROM, MRAM, phase change RAM (PCRAM), Memristor, flash memory, and the like. In addition, or alternatively, the data store 212 may comprise a device configured to read from and write to a removable media, such as, a floppy disk, a CD-ROM, a DVD-ROM, or other optical or magnetic media.

3. Method for Encoding Data

Figure 3:
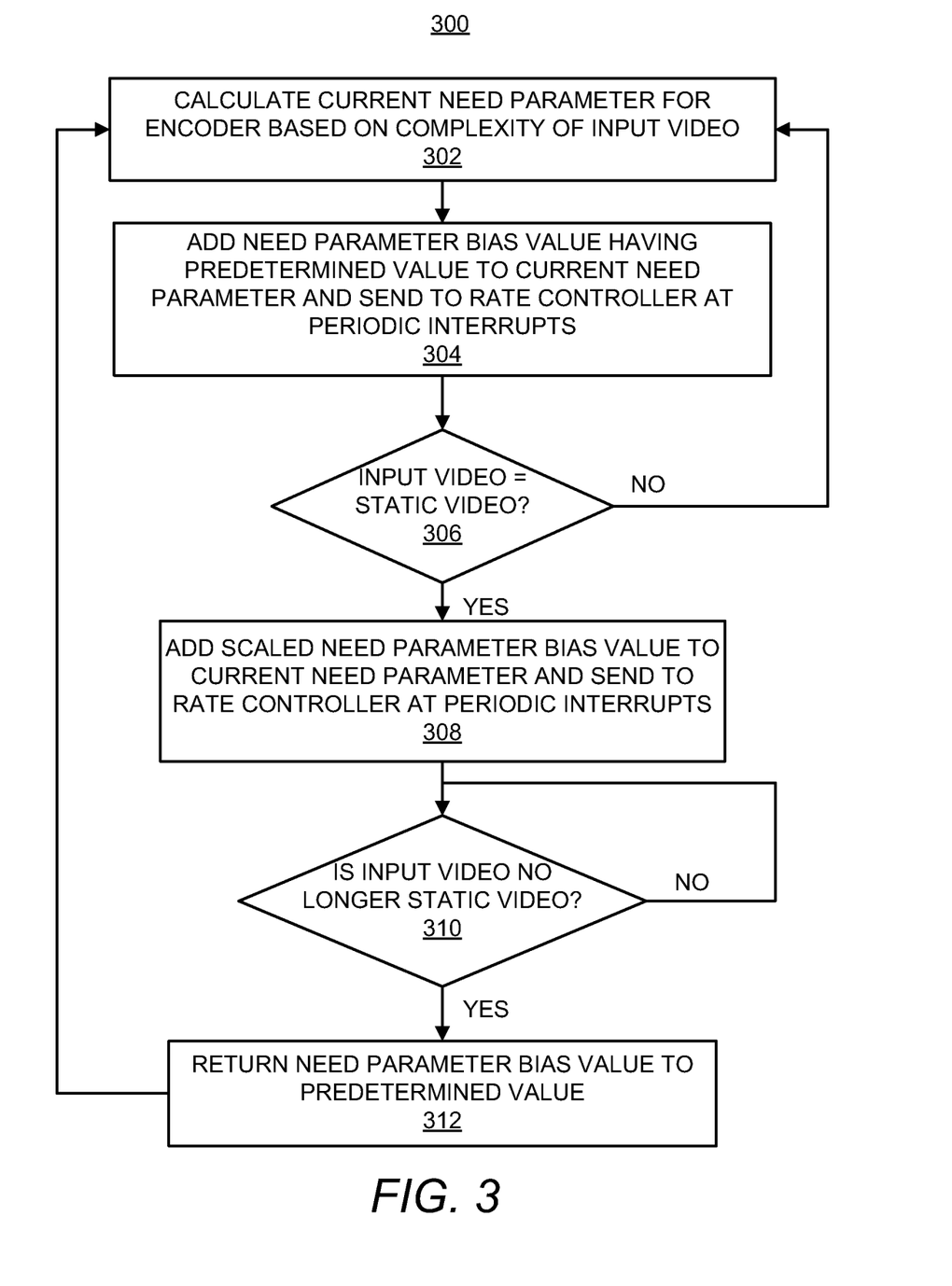
FIG. 3 illustrates a flow diagram of a method for encoding data, according to an embodiment.
Figure 4:
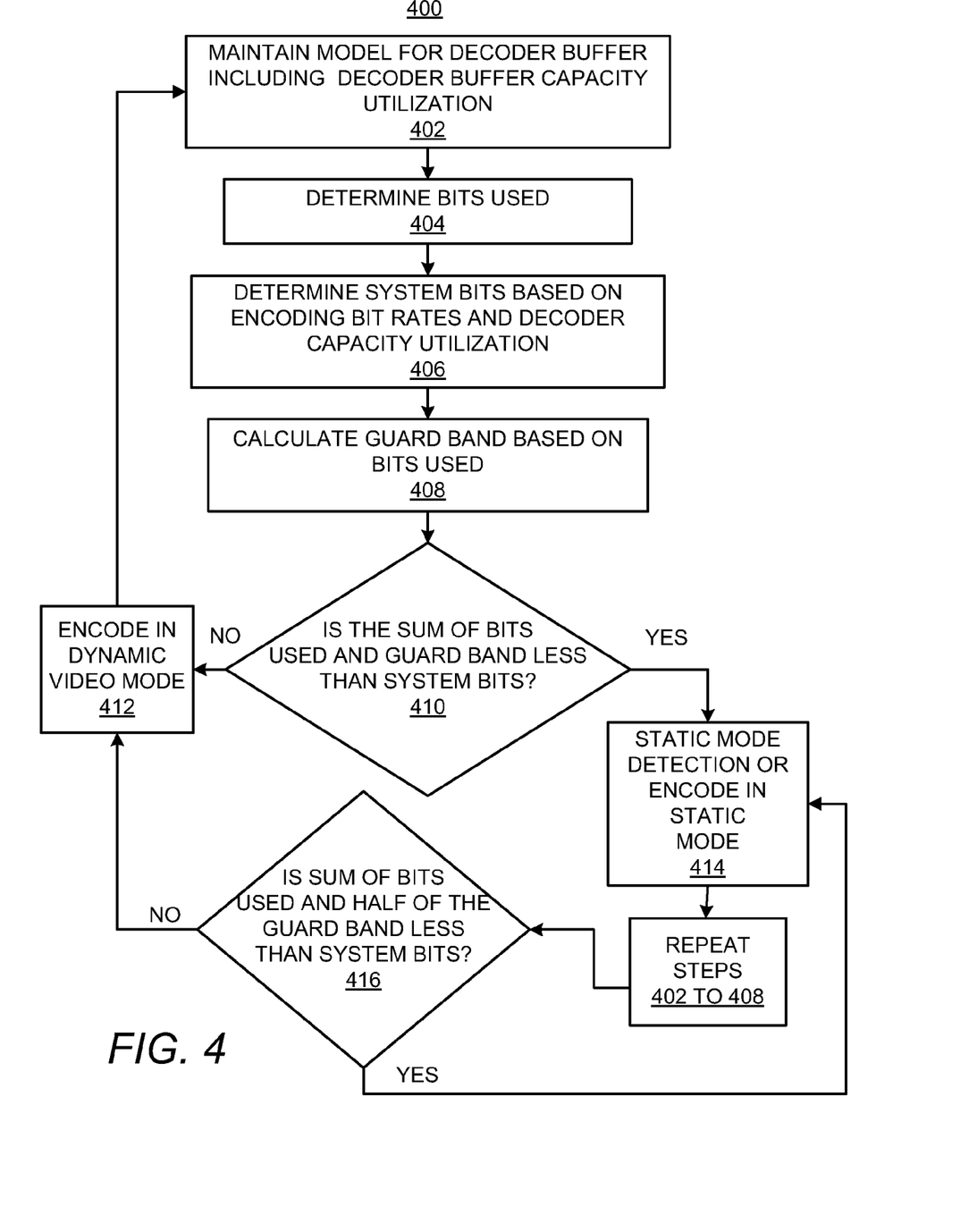
FIG. 4 illustrates a flow diagram of a method of detecting static video, according to an embodiment.

Examples of methods of operating the encoder 200 are now described with respect to the following flow diagrams of the methods 300 and 400 respectively depicted in FIGS. 3 and 4. It should be apparent to those of ordinary skill in the art that the methods 300 and 400 represent generalized illustrations and that other steps may be added or existing steps may be removed, modified or rearranged without departing from the scopes of the methods 300 and 400. In addition, the methods 300 and 400 are described with respect to the stat mux system 100 and the encoder 200 by way of example and not of limitation, and thus, the methods 300 and 400 may be used in other systems.

Some or all of the operations set forth in the methods 300 and 400 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

With reference first to FIG. 3, at step 302, a current need parameter for the encoder 200 is calculated, for instance, by the need parameter calculating module 202. The current need parameter is based on a complexity of video being input 201 to the encoder 200. In addition, at step 304, a need parameter bias value having a predetermined value is added to the need parameter calculated at step 302. The need parameter bias value may be perceptibly determined and is a constant value across all of the encoders 102a-102n in the stat mux system 100 to substantially keep all of the encoders 102a-102n running at substantially the same perceptible quality levels.

Because the need parameter bias value has a constant predetermined value, the encoders 102a-102n having video input of lower complexity run at lower QP levels that mitigate compression artifacts. Although those of the encoders 102a-102n having video input of higher complexity may run at higher QP levels, the compression artifacts are obscured somewhat by the high video complexity.

Although not explicitly depicted in FIG. 3, the encoder 200 may send the current need parameter and the need parameter bias to the rate controller 106 in a need parameter message at each periodic interrupt generated by the rate controller 106 as described hereinabove with respect to FIG. 1. The encoder 200 may also receive a bit rate information message from the rate controller 106, which includes the bit rate allocation for the encoder 200. The encoder 200 is configured to encode the bits of the current frames using the allocated bit rates in the bit rate information message.

At step 306, a determination as to whether the input video comprises static video is made, for instance, by the static video determination module 206. Video is considered to comprise static video when the video is stable and has relatively low complexity. An example of the manner in which the static video determination module 206 may determine whether the input video 201 comprises static video is described in detail hereinbelow with respect to the method 400 depicted in FIG. 4. In response to a determination that the input video is not static video, and thus comprises dynamic video, the encoder 200 continues calculating the current need parameter at step 302, adding the need parameter bias value at step 304, and sending need parameter messages at each periodic interrupt.

However, in response to a determination at step 306 that the input video 201 comprises static video, at step 308, the need parameter bias value is scaled, for instance, by the need parameter bias value scaling module 208. For instance, the need parameter bias value may be scaled, for instance, reduced, by a ratio based on the bits used, and the system bits to a point that the adjusted bias value is equal to a predetermined minimum bias value or the encoder 102a is at equilibrium state having a small unused bandwidth as described hereinabove with respect to FIG. 1. More particularly, for instance, the need parameter bias value is scaled down to the first of the equilibrium level or the predetermined minimum bias value. The predetermined minimum bias value may be selected to be a relatively small value, in which instance, the need parameter bias value will tend to discontinue scaling down at the predetermined minimum bias value. The scaled need parameter bias value may be added to the current need parameter and a need parameter message containing the current need parameter with the scaled need parameter bias value may be sent to the rate controller 106 at the next periodic interrupt. The encoder 200 may be referred to as being in a static video mode after having determined that the input video comprises static video.

By scaling, such as by reducing, the need parameter bias value when the encoder 200 is in the static video mode, the bandwidth that is allocated to the encoder 200 may substantially be reduced. As such, the amount of bandwidth wasted by the encoder 200 in encoding and communicating encoded bits of frames of static video may substantially be minimized. In one regard, the remaining bandwidth may be allocated to one or more of the other encoders 102a-102n to thereby substantially maximize usage of the available bandwidth.

Although not explicitly depicted in the method 300, the bits of the input video 201 may be encoded, for instance, by the encoding module 210 following the "no" condition at step 306 and following step 308.

At step 310, the input video 201 is monitored, for instance, by the static video determination module 206, to determine whether the input video is no longer static video. In this regard, the static video determination module 206 may determine whether the currently received frames of video comprise static video. In addition, the encoder 200 may continue to operate in the static video mode as described at step 308, for as long as the input video 201 continues to comprise static video. According to an embodiment, the need parameter bias value may be scaled on a substantially continuous basis when the currently received frames of the input video 201 continue to comprise differing levels of static video. According to another embodiment, however, the need parameter bias value may remain at the scaled value added at step 308.

At step 312, the need parameter bias value is returned to the predetermined value in response to a determination at step 312 that the input video 201 is no longer static video, for instance, by the need parameter bias value scaling module 208. Following step 312, 302-310 may be repeated for additional input video 201.

Turning now to FIG. 4, there is shown a flow diagram of a method 400 of detecting that the input video is static video, according to an embodiment. The method 400 may be implemented at step 306 of the method 300 described hereinabove. As such, the static video determination module 206 of the encoder 200 may perform the steps outlined in the method 400.

At step 402, a model for a decoder buffer is maintained, for instance, in the data store 212. As discussed above, the decoder buffer model generally comprises a model configured to predict a capacity utilization of a decoder buffer (not shown) to which the encoder 200 is configured to communicate encoded bits.

At step 404, the bits used by the encoder 200 is determined. For instance, the static video determination module 206 sums all of the bits generated in the preceding time interval for each frame encoded by the encoding module 210.

At step 406, the system bits of the encoder 200 are determined. For instance, the static video determination module 206 may use all of the encoding bit rates received in a preceding time interval and current decoder buffer capacity utilization to determine the system bits of the encoder 200, which are bits to be transferred in a next time interval, at each frame's encoding time.

At step 408, a guard band for the decoder buffer is calculated. For instance, the static video determination module 206 may set aside a guard band that is equal to a predetermined portion of the bits used. An example of a guard band is half of the bits used. The guard band performs functions as noted hereinabove with respect to FIG. 1, including preventing the encoder 200 from easily going back and forth from static video mode to dynamic video mode.

At step 410, a determination as to whether a sum of the bits used and the guard band is less than the system bits is made. In response to a determination that the sum of the bits used and the guard band exceeds the system bits, at step 412, the static video determination module 206 determines that the input video 206 comprises dynamic video and the encoding module 210 encodes the bits under a dynamic video mode. In the dynamic video mode, the need parameter bias is equal to the predetermined value, as described hereinabove with respect to FIG. 1. Depending on the state of the encoder 200 prior to this determination, the encoder 200 may either continue encoding the input video in the dynamic mode or return to the dynamic mode from a static video mode.

However, in response to a determination that the sum of the bits used and the guard band is less than the system bits at step 410, the static video determination module 206 either determines that input video should be encoded in static mode, if the encoder 200 was previously in the static mode, or commences or continues a check for static video. As described hereinabove, the encoder 200 may determine that the input video 201 comprises static video when the sum of the bits used and the guard band is less than the system bits for at least a predetermined number of time consecutive frames. After a determination that the sum of the bits used and the guard band is less than the system bits for the predetermined number of frames, the static video determination module 206 determines that the encoder 200 is in the static video mode as indicated at step 414.

In the static video mode, steps 402-408 are repeated to provide current values for the guard band, the bits used and the system bits. Thereafter at step 416, a determination as to whether the sum of the bits used and half of the guard band is less than the system bits is made. In response to a determination that the sum of the bits used and half of the guard band is less than the system bits at step 416, the encoder 200 continuously operates in the static video mode. This configuration allows some variation in the video input. As long as the variation of the bits used is less than half of the guard band, the encoder 200 remains in the static video mode. However, in response to a determination that the sum of the bits used and half of the guard band exceeds the system bits at step 416, the encoder 200 immediately reverses its operation to dynamic video mode.

Figure 5:
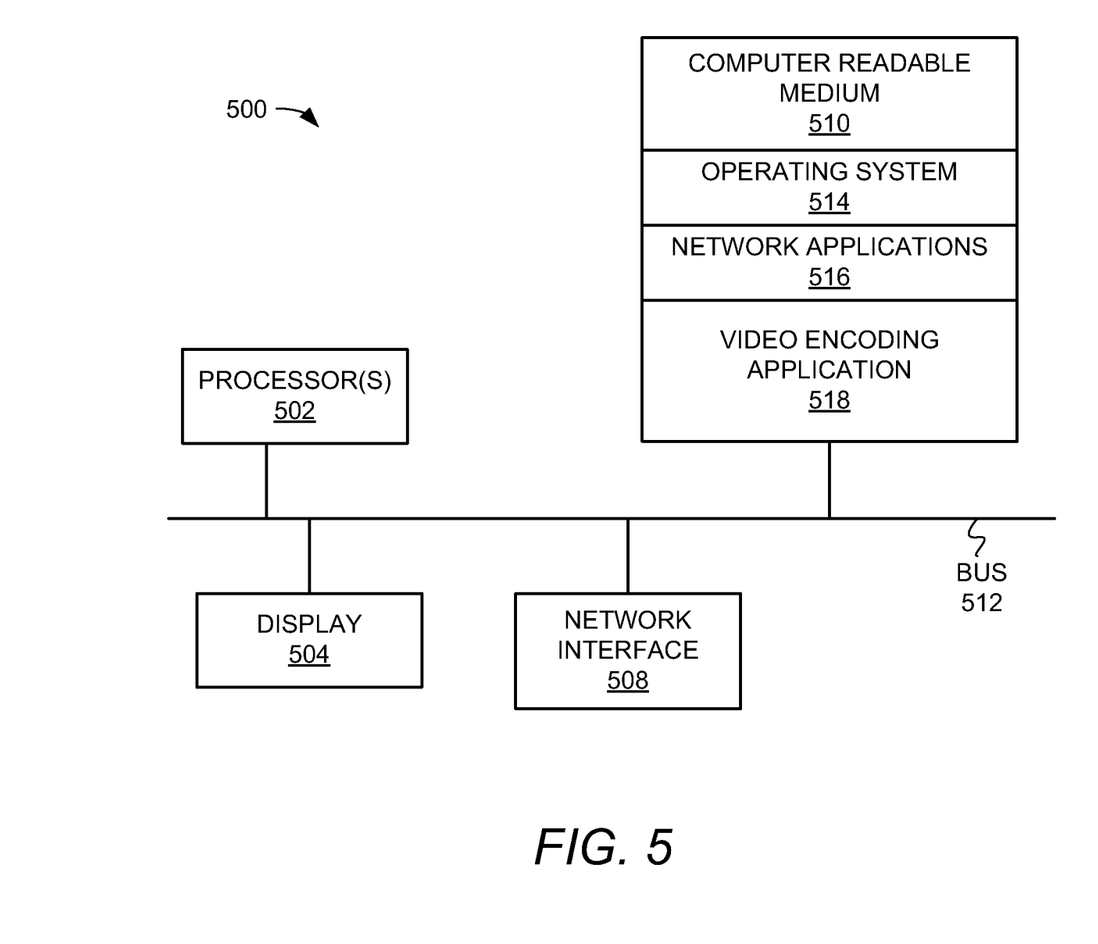
FIG. 5 shows a block diagram of a computer system that may be used in encoding data, according to an embodiment of the invention.

Turning now to FIG. 5, there is shown a schematic representation of a computing device 500 configured in accordance with embodiments of the present invention. The computing device 500 includes one or more processors 502, such as a central processing unit; one or more display devices 504, such as a monitor; one or more network interfaces 508, such as a Local Area Network LAN, a wireless 802.11x LAN, a 3G mobile WAN or a WiMax WAN; and one or more computer-readable mediums 510. Each of these components is operatively coupled to one or more buses 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other software applications, including word processors, browsers, email, Instant Messaging, media players, and telephony software.

The computer-readable medium 510 may also store an operating system 514, such as Mac OS, MS Windows, Unix, or Linux; network applications 516; and a video encoding application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504; keeping track of files and directories on medium 510; controlling peripheral devices, such as disk drives, printers, image capture device; and managing traffic on the one or more buses 512. The network applications 516 include various components for establishing and maintaining network connections, such as software for implementing communication protocols including TCP/IP, HTTP, Ethernet, USB, and FireWire.

The video encoding application 518 provides various software components for encoding data, as discussed above. In certain embodiments, some or all of the processes performed by the application 518 may be integrated into the operating system 514. In certain embodiments, the processes can be at least partially implemented in digital electronic circuitry, or in computer hardware, firmware, software, or in any combination thereof, as also discussed above.

Through implementation of the method and apparatus disclosed herein, the need parameter bias value may be scaled, for instance, reduced, to accommodate for the reduced bandwidth required to encode static video, which has relatively low complexity. In one regard, by reducing the need parameter bias value for an encoder, the amount of bandwidth allocated to the encoder when the encoder is encoding static video is substantially minimized, thereby reducing or minimizing wasted bandwidth allocation to the encoder.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method of encoding data, the method comprising:
    calculating, by a processor, a current need parameter for the encoder by updating a previous need parameter based on a complexity of video being input to the encoder;
    adding a need parameter bias value having a predetermined value based on whether the video contains static video to the current need parameter;
    determining whether the input video comprises static video after adding the need parameter bias value to the current need parameter; and
    scaling the need parameter bias value in response to a determination that the input video comprises static video:
    determining bits used, wherein the bits used comprise bits generated in a preceding time interval;
    determining system bits, wherein the system bits comprise bits to be transferred in a next time interval, and wherein the system bits are determined based on encoding bit rates received in the preceding time interval and a current capacity utilization of the decoder buffer, and wherein the preceding time interval is of equal duration to the next time interval;
    calculating a guard band based on the bits used; and
    wherein determining whether the input video comprises static video comprises determining whether a sum of the bits used and the guard band is less than the system bits for at least a predetermined number of time consecutive frames.

2. The method of claim 1, wherein determining whether the input video comprises static video further comprises:
    determining whether the encoder provides enough bits to fill an allocated bit rate capacity.

3. The method of claim 1, further comprising:
    determining whether the input video received by the encoder is no longer static video; and
    returning the need parameter bias value to the predetermined value in response to a determination that the input video received by the encoder is no longer static video.

4. The method of claim 1, said method further comprising:
    maintaining a model for the decoder buffer; and
    determining the current capacity utilization of the decoder buffer based upon the model for the decoder buffer.

5. The method of claim 1, wherein determining whether a sum of the bits used and the guard band is less than the system bits for at least a predetermined number of time consecutive frames further comprises:
    determining whether the sum of the bits used and the guard band is less than the system bits for an initial frame in the input video; and
    determining whether the sum of the bits used and the guard band is less than the system bits for a predetermined number of frames following the initial frame.

6. The method of claim 1, further comprising:
    maintaining an encoding bit rate for the encoder such that the bits used is kept approximately equal to the system bits and the capacity utilization of the decoder buffer is within a range that is approximately centered on a predetermined target level.

7. The method of claim 1, wherein scaling the need parameter bias value in response to a determination that the input video comprises static video further comprises:
    scaling the need parameter bias value by a ratio based on the bits used and the system bits to a point that one of the scaled need parameter bias value is equal to a predetermined minimum bias value and the at least one of the plurality of statistically multiplexed encoders is at a substantially equilibrium state having a relatively small unused bandwidth.

8. The method of claim 1, wherein the encoder is part of a statistically multiplexed encoder group comprising a plurality of encoders and a rate controller, the method further comprising:
    sending a need parameter message to the rate controller, wherein the need parameter message includes the current need parameter and the varied need parameter bias value, wherein the rate controller is configured to allocate bit rates for the encoders in multiplexed encoder group based upon information contained in the need parameter message;
    receiving the allocated bit rates from the rate controller; and
    encoding the input video using the allocated bit rates.

9. An encoder comprising:
    one or more modules configured to calculate a current need parameter for the encoder by updating a previous need parameter based on a complexity of video being input to the encoder, add a need parameter bias value having a predetermined value based on whether the video contains static video to the current need parameter, determine whether the input video comprises static video after adding the need parameter bias value to the current need parameter, and vary the need parameter bias value in response to a determination that the input video comprises static video; and
    a processor configured to implement the one or more modules,
    wherein the encoder is associated with a decoder buffer, wherein the one or more modules are further configured to determine bits used, wherein the bits used comprise bits generated in a preceding time interval, to determine system bits, wherein the system bits comprise bits to be transferred in a next time interval, wherein the system bits are determined based on encoding bit rates received in the preceding time interval and a current capacity utilization of the decoder buffer, and wherein the preceding time interval is of equal duration to the next time interval, and to calculate a guard band based on the bits used, and wherein the input video is determined to comprise static video in response to a determination that a sum of the bits used and the guard band is less than the system bits for at least a predetermined number of time consecutive frames.

10. The encoder of claim 9, wherein the one or more modules are further configured to determine whether the encoder produces enough bits to fill an allocated bit rate capacity.

11. The encoder of claim 9, wherein the one or more modules are further configured to determine whether the input video received by the encoder is no longer static video, and to return the need parameter bias value to the predetermined value in response to a determination that the input video received by the encoder is no longer static video.

12. The encoder of claim 9, where in the one or more modules are configured to maintain a module for the decoder buffer and to determine the current capacity utilization of the decoder buffer based upon the model for the decoder buffer.

13. The encoder of claim 9, wherein the one or more modules are further configured to determine that the sum of the bits used and the guard band is less than the system bits for an initial frame in the input video, and determine that the sum of the bits used and the guard band is less than the system bits for a predetermined number of frames following the initial frame to determine whether the sum of the bits used and the guard band is less than the system bits for at least a predetermined number of time consecutive frames.

14. The encoder of claim 9, wherein the one or more modules are further configured to maintain an encoding bit rate for the encoder such that the bits used is kept approximately equal to the system bits and the capacity utilization of the decoder buffer is within a range that is approximately centered on a predetermined target level.

15. The encoder of claim 9, wherein the one or more modules are further configured to scale the need parameter bias value by a ratio based on the bits used, and the system bits to a point that one of the scaled bias value is equal to a predetermined minimum bias value and the at least one of the plurality of statistically multiplexed encoders is at a substantially equilibrium state having a relatively small unused bandwidth.

16. The encoder of claim 9, wherein the encoder is part of a statistically multiplexed encoder group comprising a plurality of encoders and the rate controller, wherein the one or more modules are further configured to send a need parameter message to the rate controller and wherein the rate controller is configured to allocate bit rates for the encoders in multiplexed encoder group based upon information contained in the need parameter message, and to receive the allocated bit rates from the rate controller.

17. The method of claim 1, wherein the step of determining is made without a determination of motion in scenes.

* * * * *